United States Patent [19]

Shibata et al.

[11] Patent Number: 4,744,432
[45] Date of Patent: May 17, 1988

[54] COOLING APPARATUS FOR VEHICLE ENGINE

[75] Inventors: Hirotaka Shibata, Hamamatsu; Masahiro Nishioka, Iwata, both of Japan

[73] Assignee: Yamaha Hatsudoki Kabushiki Kaisha, Iwata, Japan

[21] Appl. No.: 821,401

[22] Filed: Jan. 22, 1986

[30] Foreign Application Priority Data

Jan. 28, 1985 [JP] Japan ................................. 60-12359

[51] Int. Cl.⁴ ............................................... B62K 5/00
[52] U.S. Cl. ................................. 180/68.1; 123/41.65; 180/215; 180/229
[58] Field of Search ................... 180/68.1, 68.2, 68.3, 180/68.4, 229, 219, 215, 217; 123/41.65, 41.66, 41.7

[56] References Cited

U.S. PATENT DOCUMENTS

| | | | |
|---|---|---|---|
| 3,099,983 | 8/1963 | Orlando et al. | 123/41.65 |
| 3,669,082 | 6/1972 | Hatz | 123/41.65 |
| 3,791,482 | 2/1974 | Sykora | 180/68.1 |
| 3,819,000 | 6/1974 | Larsen | 180/68.1 |
| 4,535,869 | 8/1985 | Tsutsumikoshi | 180/215 |
| 4,546,843 | 10/1985 | Koinuma | 180/229 |
| 4,573,550 | 3/1986 | Inomata | 180/215 |
| 4,621,680 | 11/1986 | Funabashi | 180/229 |
| 4,632,070 | 12/1986 | Onda et al. | 180/229 |

FOREIGN PATENT DOCUMENTS 560501 10/1923 France ................................. 180/229

*Primary Examiner*—David M. Mitchell
*Attorney, Agent, or Firm*—Ernest A. Beutler

[57] ABSTRACT

Several embodiments of balloon tired, off the road vehicles embodying improved cooling systems. In each embodiment, the engine is surrounded by a cooling shroud and a fan is provided for driving air across the engine. The fan is offset from the engine crankshaft axis and is driven by it. In some embodiments, foreign matter is precluded from entry into the shroud inlet by positioning the inlet in a protected area such as over the fender, under the body, under the fuel tank, or under the seat.

6 Claims, 6 Drawing Sheets

COOLING APPARATUS FOR VEHICLE ENGINE

BACKGROUND OF THE INVENTION

This invention relates to a cooling apparatus for a vehicle engine and more particularly to an improved air cooling system for an off the road type vehicle.

The use of off the road balloon tired, single passenger vehicles is well known. Such vehicles employ at least two wheels at one end of the vehicle and at least one wheel at the other end of the vehicle with a supporting frame and saddle type rider seat carried by the frame between the wheels. In addition, a powering engine is carried by the frame and is positioned generally between the seat and in an area where it will be straddled by the rider's legs.

This type of vehicle was intended originally primarily for recreational purposes. It has been found recently, however, that such vehicles are very well suited for use in agricultural purposes. Therefore, this type of vehicle may be used either for recreation or work.

As with any vehicle, it is important that the engine be adequately cooled. This is particularly true in connection with a vehicle of the aforedescribed type since the engine is positioned in the open frame and is disposed between the front and rear wheels and in close proximity to the rider. The use of air cooled engines for this purpose has the advantage of simplicity. The use of air cooled engines in such types of vehicles, however, presents certain problems.

In the first instance, the engine is normally disposed with its crankshaft extending transversely to the longitudinal center line of the vehicle. Hence, if a cooling fam is driven by the engine in a conventional manner, it tends to increase the width of the power plant and because the power plant is positioned between the rider's legs, it can give rise to an unnatural riding position.

It is, therefore, a principal object of this invention to provide an improved air cooling arrangement for a vehicle.

It is a further object of this invention to provide an improved air cooling arrangement for a vehicle of the single rider type.

It is yet a further object of this invention to provide an improved and compact cooling fan drive for a vehicle of this type.

As has been noted, vehicles of the type described are primarly intended for off the road use. Because of the open frame construction and the positioning of the engine, it is likely that the engine and particularly the cooling fans may be clogged with foreign material that is thrown up by the wheels. Furthermore, it is important that the heat that is removed from the engine be ducted away from the rider so that the rider will not become uncomfortably warm. This is particularly true since in agricultural applications, the vehicle may be operated in a stationary manner with the engine running for long periods of time.

It is, therefore, a still further object of this invention to provide an improved cooling system for a vehicle of this type.

It is yet a further object of this invention to provide an improved cooling shroud arrangement for the engine of an off the road vehicle.

SUMMARY OF THE INVENTION

The invention is adapted to be embodied in a vehicle having a generally open frame, a pair of wheels supported at one end of the frame and at least one wheel supported at the other end of the frame. A saddle type seat is supported by the frame and an engine is supported by the frame beneath the seat and between the wheels. The engine is air cooled and has a crankshaft rotatable about an axis extending generally transversely relative to the frame and at least one cylinder that extends from the crankshaft.

In accordance with a first feature of the invention, an air cooling fan for forcing cooling air across the cylinder is positioned so that it is rotatable about an axis that is displaced from the axis of the crankshaft and which is juxtaposed to the cylinder.

In accordance with another feature of the invention, the engine cylinder is surrounded by a cooling shroud and an air inlet is provided for admitting air to the cooling shroud and an air outlet is provided for discharging heated air from the shroud. Means are provided for circulating air from the inlet to the outlet and through the shroud.

DETAILED DESCRIPTION OF THE PREFERRED EMBODIMENTS

Embodiment of FIGS. 1 Through 5

Figure 1:
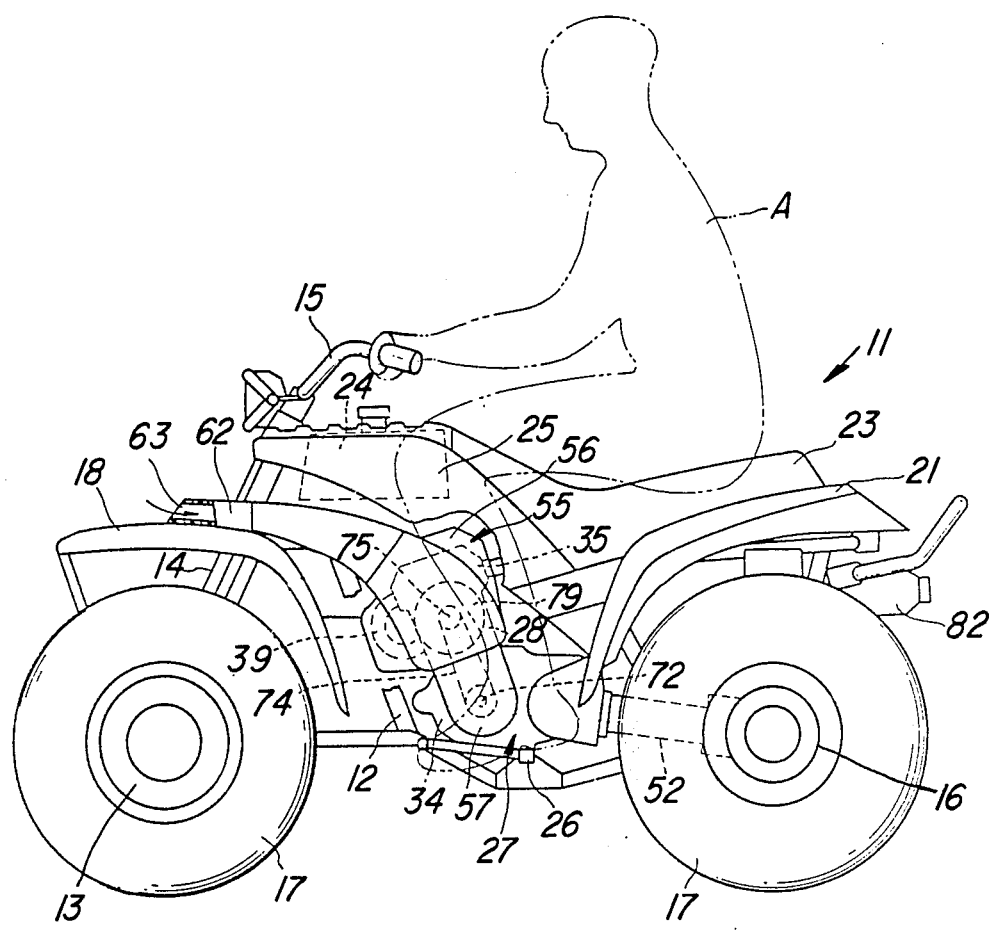
FIG. 1 is a side elevational view of an off the road vehicle constructed in accordance with a first embodiment of the invention.
Figure 2:
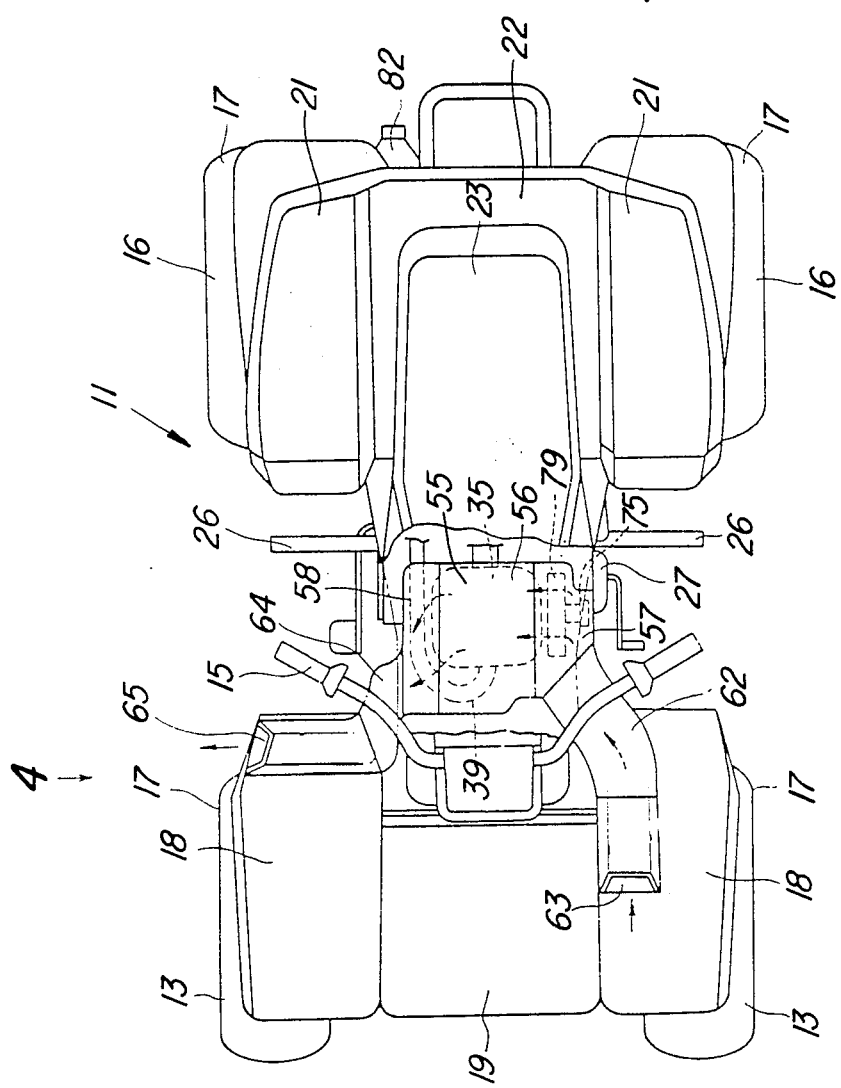
FIG. 2 is a top plan view of the vehicle.
Figure 3:
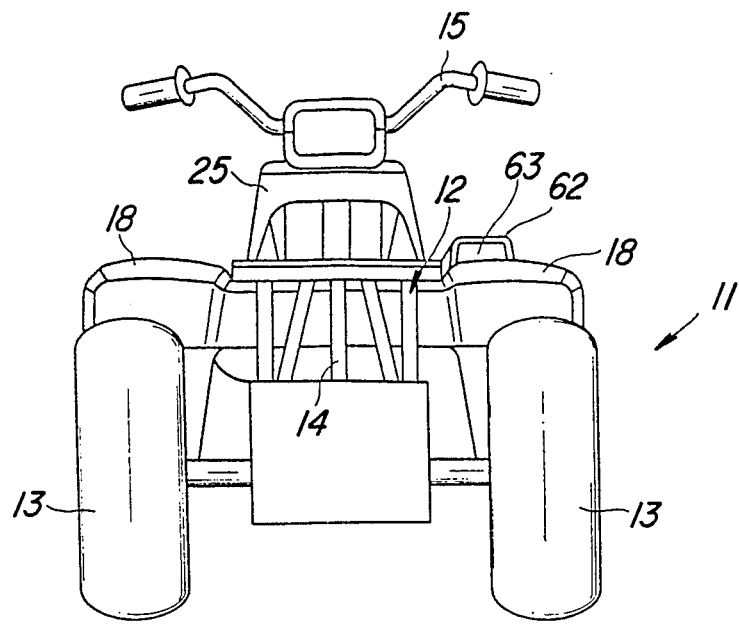
FIG. 3 is a front plant view of the vehicle.
Figure 4:
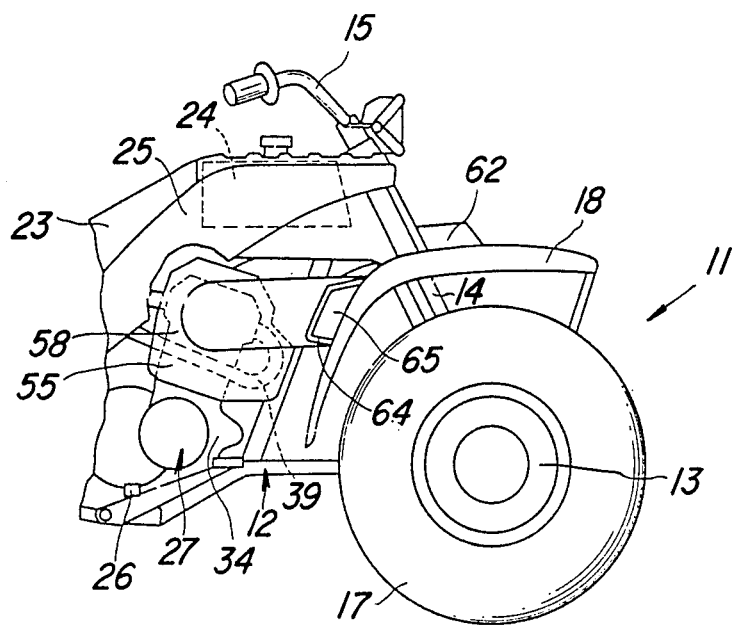
FIG. 4 is a partial side elevational view looking generally in the direction of the arrow 4 in FIG. 2 and showing the side opposite that shown in FIG. 1.

A vehicle constructed in accordance with a first embodiment of the invention is identified generally by the reference numeral 11. The vehicle 11 is comprised of a frame, indicated generally by the reference numeral 12. The frame 12 may be of any known type but is comprised of a plurality of welded up tubes that form a generally open type of frame. A pair of front wheels 13 are supported by the frame 12 in a suitable manner and are supported for steering by means of a steering shaft 14 and handlebar assembly 15 in a known manner. A pair of rear wheels 16 are supported at the opposite end of the frame and are driven, in a manner to be described. The wheels 13 and 16 each mount large, low pressure balloon type tires 17. These tires are of the type that are normally inflated to a relatively low pressure, such as an air pressure in the range of 0.1 to 0.2 kg/cm$^2$.

A body is carried by the frame 12 and is formed from a suitable material such as a synthetic resin. The body is comprised of a pair of front fenders 18 that overlie the upper portion of the front wheels 13 and their mounted tires 17 and which depend rearwardly behind at least a portion of them. The front fenders 18 are integrally connected to each other by a cowling or nose piece 19.

A pair of rear fenders 21 extend over the upper portion of the rear wheels 16 and mounted tires 17 and also depend forwardly of the rear wheels and mounted tires. Like the front fenders, the rear fenders 21 are integrally connected to each other by means of a joining piece 22 which forms a single saddle type seat 23 on which a rider, indicated in phantom and identified by the character A, may be seated.

A fuel tank 24 is carried by the frame 12 forwardly of the seat 23 and rearwardly and beneath the handlebar 15. A cowling 25 extends at least in part over the fuel tank 24 has a generally downwardly opening configuration of U-shaped cross-section. If desired, the cowling 25 may be formed integrally with the seat 23, rear fenders 21 and joining portion 22. Alternatively, these two components may be separately formed and affixed to each other in a suitable manner.

A pair of foot pegs 26 are carried by the frame assembly 12 and are positioned so as to offer a convenient foot support for the rider A.

Figure 5:
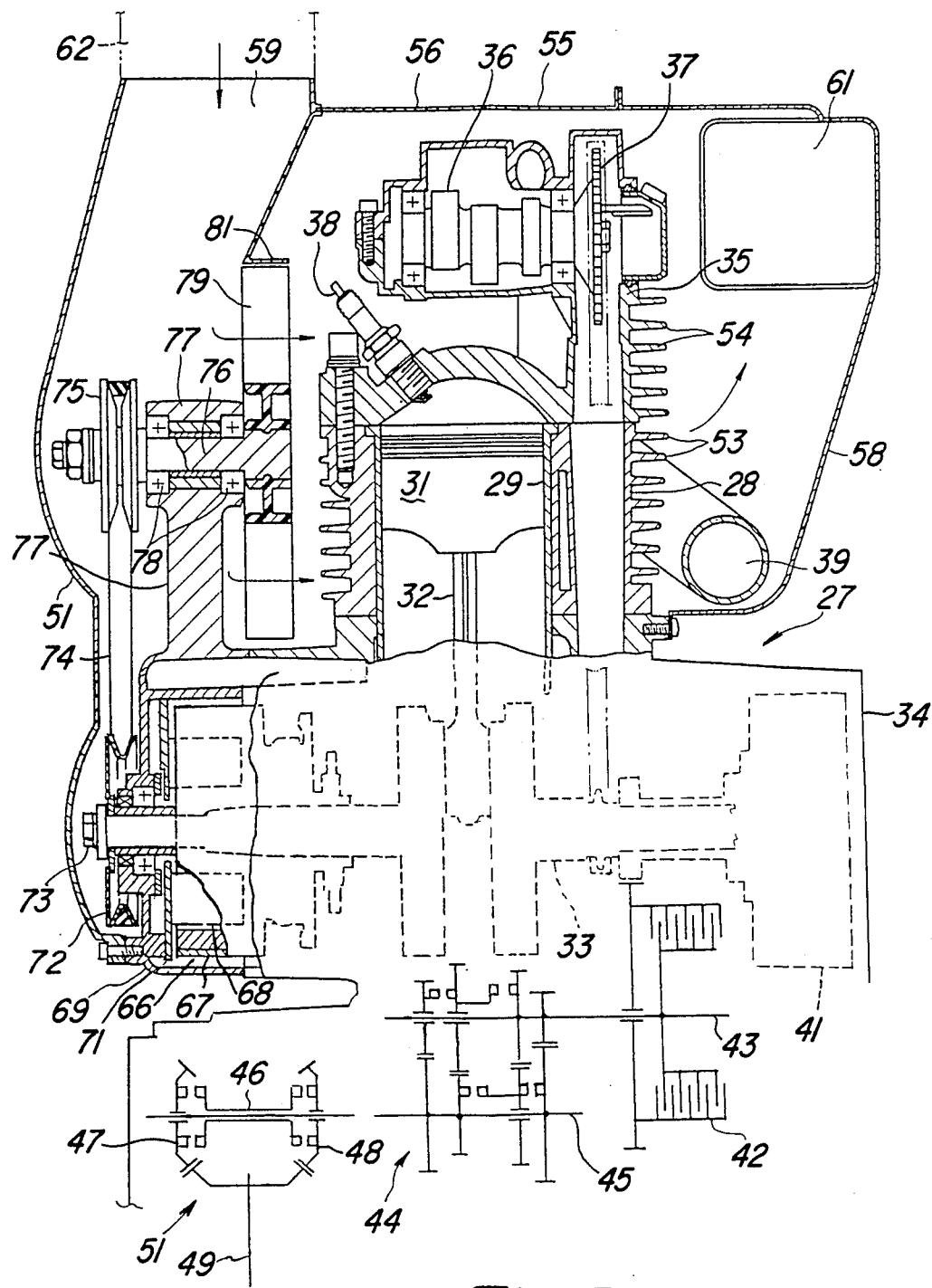
FIG. 5 is an enlarged view of the power plant and transmission mechanism, with portions shown in section.

A power plant, indicated generally by the reference numeral 27 and shown in most detail in FIG. 5, is carried by the frame 12 in a suitable manner for powering the rear wheels 16 and their mounted tires 17. The power plant 27, in the illustrated embodiment, is of the reciprocating type and includes a cylinder block 28 having a cylinder bore 29 in which a piston 31 is supported for reciprocation. The piston 31 is connected, by means of a connecting rod 32, to a crankshaft 33 that is rotatably journaled within a crankcase 34. The axis of rotation of the crankshaft 33 extends transversely relative to the longitudinal center line of the frame 12.

A cylinder head 35 is affixed to the cylinder block 28 in a known manner and rotatably journals a camshaft 36 for operating overhead valves (not shown) mounted within the cylinder head 35 in a known manner. The camshaft 36 is driven by means including a timing chain or belt 37 from one end of the crankshaft 33.

A suitable charge former, such as a carburetor, is provided for introducing a fuel/air charge to the engine combustion chamber. This charge is fired by means of a spark plug 38 which is mounted within the cylinder head 35. The burnt charge is delivered from the combustion chamber through the exhaust valve to an exhaust pipe 39.

The crankshaft 33 drives a centrifugal clutch 41 which is mounted within the crankcase 34 and which, in turn, drives a multiple disk clutch 42. The multiple disk clutch 42 selectively drives in input shaft 43 of a change speed transmission, indicated generally by the reference numeral 44. The change speed transmission 44 may have any number of forward gear ratios and drives a secondary shaft 45 at the ratio selected by the rider. The secondary shaft 45 drives a dog clutching member 46 that is slidably supported between a pair of bevel gears 47 and 48 which are journaled on the secondary shaft 45. By selectively engaging one of the gears 47 or 48 with the shaft 45 through the dog clutching element 46, an drive shaft 49 may be driven in either a forward or reverse direction. The forward, neutral, reverse transmission is identified generally by the reference numeral 51.

The driveshaft 49 extends through a drive shaft housing 52 (FIG. 1) and drives the rear wheels 16 in a known manner.

As may be readily seen from FIG. 1, the power plant 27 is carried by the frame 12 between the front and rear wheels 13 and 16 and generally beneath the seat 23 and between the legs of the rider A. Because of this location of the power plant 27, it is disposed in an area wherein foreign matter thrown up by the tires 17 may impinge upon it. In addition, the use of the large balloon tires 17 substantially restricts the air flow to the engine 27 even though the frame 12 is of the open type. For this reason, an air cooling system is provided for the engine and specifically the cylinder block 28 and cylinder head 35. In addition, this air cooling system is contructed and arranged in such a way so that the heat transferred from the engine will be disbursed away from the rider A. This is important since the off the road use for the vehicle 11 tends to cause the power plant 28 to be driven at high loads and relatively low speeds. In addition, if the vehicle 11 is used for agricultural purposes, the power plant 27 may be run for long periods of time with the vehicle 11 stationary.

The air cooling system includes a plurality of cooling fins 53 formed on the cylinder block 28 and a plurality of cooling fins 54 formed on the cylinder head 35.

In order to protect the engine of the power plant 27 from foreign material which may be thrown up by the tires 17 and to direct the cooling air flow across the fins 53 and 54 in the desired pattern, a shroud, indicated generally by the reference numeral 55, encircles the cylinder block 28, cylinder head 35 and camshaft 36. The shroud 55 includes a main body piece 56 that encircles the cylinder block 28, cylinder head 35 and camshaft 36. The opposite ends of the main body piece 56 are closed by respective cover pieces 57 and 58. The cover piece 57 covers not only the cylinder block 28, cylinder head 35 and camshaft 36 but also encloses one end of the crankcase 35. The cover piece 58 covers the opposite end of the cylinder block 28, cylinder head 35 and camshaft 36 and also encloses a portion of the exhaust pipe 39. The cover piece 57 is provided with an air inlet opening 59 that is disposed at its upper end and the cover piece 58 defines an outlet opening 61 that is formed in the upper front portion of the cover piece 58.

Referring now primarily to FIGS. 1 through 4, the inlet opening 59 of the cover piece 57 cooperates with an air inlet duct, indicated generally by the reference numeral 62. The inlet duct 62 extends forwardly and upwardly from the inlet opening 59 and terminates on the upper surface of one of the front fenders 18 wherein an air inlet opening 63 is provided. Thus, air for the cooling system will be delivered from the inlet opening 63 in an area that is protected from foreign matter which may be thrown up by the tires 17 and specifically those associated with the front wheels 13. In this way, it will be insured that foreign matter will not be delivered into the engine air cooling engine.

A cooling air discharge duct 64 is affixed to the cover piece 58 in registry with its discharge opening 61 for receiving the exhausted cooling air. The duct 64 extends forwardly and then turns outwardly to extend along the rear edge of the front fender 18 associated with the front wheel opposite that which the inlet duct 62 overlies. The exhaust duct 64 terminates in a sidewardly opening cooling air exhaust outlet 65. In this way, the hot cooling air will be discharged away from the rider A.

A circulating fan is provided for circulating cooling air through the shroud assembly 55 from the inlet duct 62 to the exhaust duct 64. This cooling fan drive arrangement is best shown in FIG. 5.

The side of the crankshaft 33 opposite to that which drives the centrifugal clutch 41 drives a magneto generator, indicated generally by the reference numeral 66. The magneto generator 66 includes a magnet carrying ring 67 that is rotatably coupled to the crankshaft 33 and which cooperates with a plurality of stationary coil windings 68 in a known manner. The magneto generator 66 is covered by means of a cover plate 69. A disk 71 is fixed relative to the cover 69 and carries the coils 68.

A pulley 72 is affixed to an exposed end of the crankshaft 33 by means of a nut 73. The pulley 72 drives a belt 74 which, in turn, drives a pulley 75 that is affixed to a shaft 76 that is journaled in a boss 77 formed on the crankcase 34 by means of a pair of spaced bearings 78. An axial flow fan 79 is affixed to the opposite end of the shaft 77 and in a fan opening 81 formed on the main shroud piece 56 in proximity to the cylinder block 28 and cylinder head 35. The axis of rotation of the fan 79 is juxtaposed to the interface between the cylinder block 28 and the cylinder head 35. The blades of the fan 79 will discharge the cooling air directly across the fins 53 and 54 so as to effect cooling of the cylinder block and cylinder head. In addition, the chain 37 for driving the camshaft 36 will be cooled as will the portion of the exhaust pipe 39 which extends through the shroud assembly 55.

It should be noted that the drive for the fan 79 is at the opposite end of the crankshaft from the camshaft drive 37 and the offset relationship of the fan 79 permits it to be nested over the magneto generator 66 and does not entail any increase in the width of the power plant 27.

The exhaust gases are delivered from the exhaust pipe 39 to a rearwardly positioned muffler 82 for discharge to the atmosphere.

Figure 6:
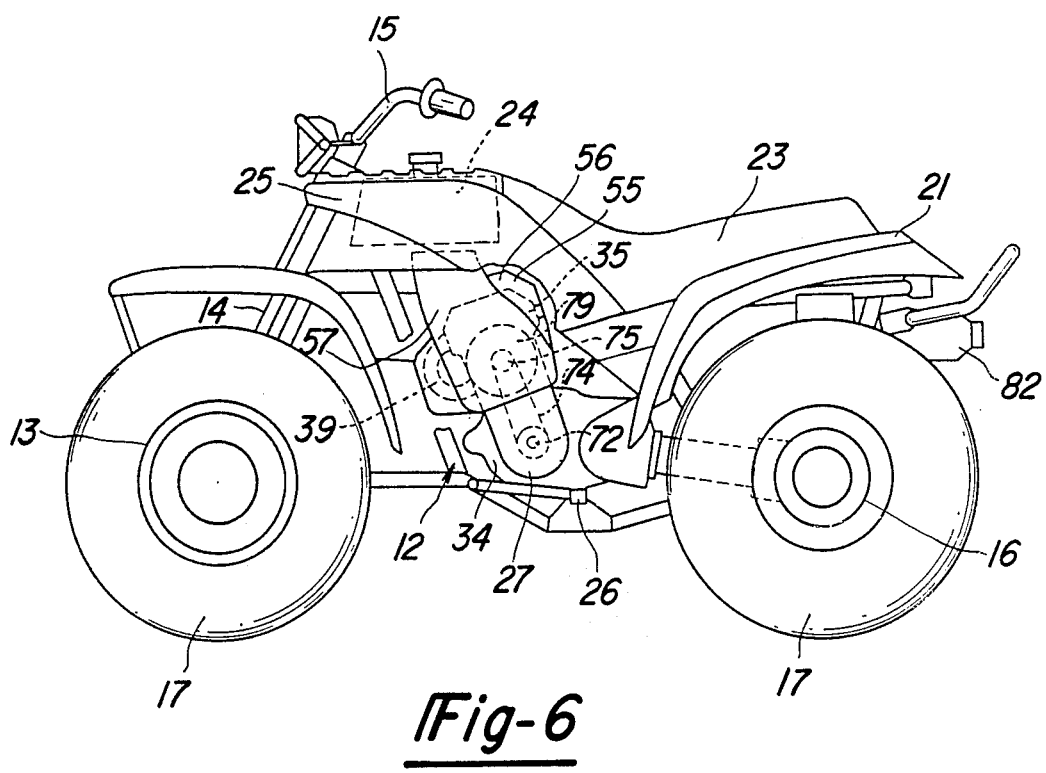
FIG. 6 is a side elevational view of a vehicle constructed in accordance with another embodiment of the invention.
Figure 7:
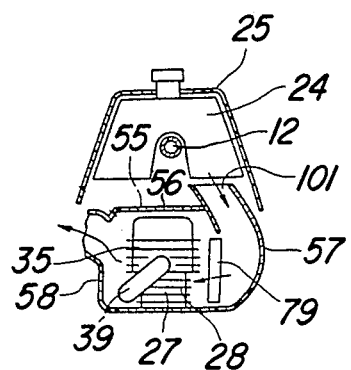
FIG. 7 is a cross-sectional view, in part similar to FIG. 5, showing the construction of this embodiment.

Embodiment of FIGS. 6 And 7

This embodiment differs from the embodiment of FIGS. 1 through 5 only in that the inlet duct 62 is eliminated. Because of this, components which are the same as those of the previous embodiment have been identified by the same reference numerals and will not be described again. In this embodiment, a source of clean fresh cooling air is provided by an inlet duct 101 that is formed in the cover member 57 and which extends upwardly to a position contiguous to the lower end of the fuel tank 24 and in an area wherein the sides of the cowling 25 depend beneath the opening 101 so as to insure that foreign matter will not be drawn into the cooling system for the power plant 27.

Figure 8:
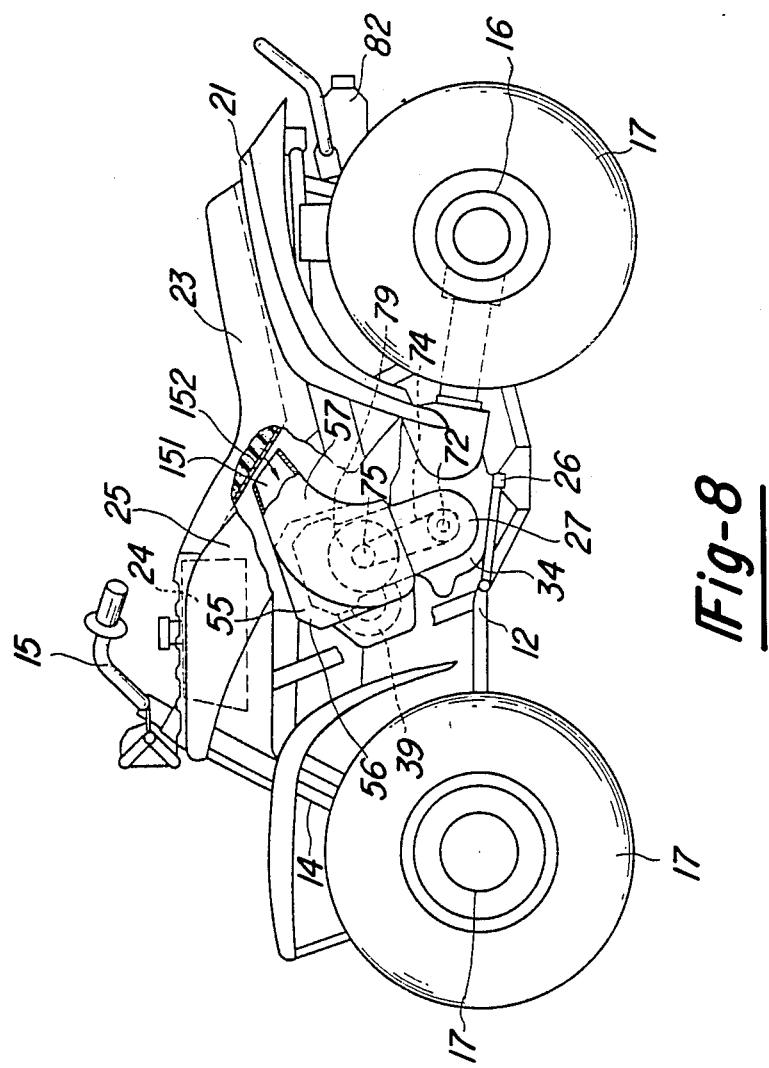
FIG. 8 is a side elevational view, with a portion broken away, of a still further embodiment of the invention.

Embodiment Of FIG. 8

This embodiment is like the embodiment of FIGS. 6 and 7 in that the inlet duct of the embodiment of FIGS. 1 through 5 has been eliminated. Because of this, components which are the same as the embodiment of FIGS. 1 through 5 have been identified by the same reference numerals and will not be described again, except insofar as is necessary to understand the construction and operation of this embodiment.

In this embodiment, the shroud cover piece 57 is formed with an upwardly and rearwardly extending projection 151 that has an inlet opening for the cooling air that is juxtaposed to an underside surface 152 of the seat 23. It should be noted that the seat 23 has downwardly depending sides that overlie the opening 151 so like the previously described embodiments only clean cooling air will be delivered to the area within the shroud 55.

It should be readily apparent from the foregoing description that each embodiment of the invention provides a good source of cooling air for the engine and will insure against foreign matter from being drawn into the cooling system for the engine. In addition, the protective shroud will provide some silencing for the engine and also provides cooling for the exhaust pipe. Thus, rider comfort is significantly increased. In each of the described embodiments, the cooling fan was driven by the engine crankshaft. It is to be understood, however, that the cooling fan may be driven in any other suitable manner such as by the camshaft or electrically while embodying the concepts disclosed with respect to the configuration of the cooling shroud. Of course, however, there are particularly advantages to the fan drive as illustrated and described in providing a compact configuration.

It is to be understood that the foregoing description is only that of preferred embodiments of the invention and that various changes and modifications may be made without departing from the spirit and scope of the invention, as defined by the appended claims.

We claim:

1. In a vehicle having a generally open frame, a pair of wheels supported at one end of said frame, at least one wheel supported at the other end of said frame, a saddle type seat supported by said frame, and an engine supported by said frame beneath said seat and between said wheels, said engine being air cooled and having a crankshaft rotatable about an axis extending generally transversely relative to said frame and at least one cylinder extending from said crankshaft, a cylinder head, inlet and exhaust valves in said cylinder head, a cam shaft journaled in said cylinder head for operating said intake and exhaust valves, means for driving said cam shaft from one end of said crankshaft, the improvement comprising a cooling shroud carried by the engine and surrounding the engine and defining an air path, an air cooling fan in said cooling shroud rotating about an axis displaced from the axis of said crankshaft and juxtaposed to said cylinder and said cylinder head, and means for driving said fan from the other end of said crankshaft for forcing cool air through said cooling shroud air path.

2. In a vehicle as set forth in claim 1 wherein the crankshaft extends at the end of the fan drive beyond the cylinder and the fan is disposed inwardly from that end of the crankshaft.

3. In a vehicle as set forth in claim 2 wherein the end of the crankshaft that drives the camshaft further drives a change speed transmission for powering the vehicle.

4. In a vehicle as set forth in claim 3 wherein the wheels support low pressure balloon tires for off the road use.

5. In a vehicle as set forth in claim 4 wherein there are a pair of wheels at each end of the frame.

6. In a vehicle as set forth in claim 5 wherein one pair of wheels is driven and one pair of wheels is steered.

* * * * *